US007269791B2

(12) United States Patent
Fujikawa

(10) Patent No.: US 7,269,791 B2
(45) Date of Patent: Sep. 11, 2007

(54) RECORDING MEDIUM STORING DOCUMENT CONSTRUCTING PROGRAM

(75) Inventor: Yasuyuki Fujikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 682 days.

(21) Appl. No.: 09/818,556

(22) Filed: Mar. 28, 2001

(65) Prior Publication Data
US 2002/0052899 A1 May 2, 2002

(30) Foreign Application Priority Data
Oct. 31, 2000 (JP) ............................. 2000-333616

(51) Int. Cl.
*G06F 15/00* (2006.01)
(52) U.S. Cl. .................... 715/530; 715/513; 715/500
(58) Field of Classification Search ................ 715/530, 715/513, 501.1, 500; 709/201, 224, 229
See application file for complete search history.

(56) References Cited

U.S. PATENT DOCUMENTS

| 5,293,629 | A | * | 3/1994 | Conley et al. ............. 717/154 |
| 5,708,825 | A | * | 1/1998 | Sotomayor ............... 715/501.1 |
| 5,999,912 | A | * | 12/1999 | Wodarz et al. ............ 705/14 |
| 6,061,698 | A | * | 5/2000 | Chadha et al. ............ 715/513 |
| 6,173,311 | B1 | * | 1/2001 | Hassett et al. ............ 709/202 |
| 6,324,536 | B1 | * | 11/2001 | Rofrano ................... 707/5 |
| 6,470,349 | B1 | * | 10/2002 | Heninger et al. .......... 707/102 |
| 6,523,002 | B1 | * | 2/2003 | Gao et al. ................. 704/207 |
| 6,681,371 | B1 | * | 1/2004 | Devanbu .................. 715/515 |
| 6,691,281 | B1 | * | 2/2004 | Sorge et al. ............... 715/503 |
| 6,839,881 | B2 | * | 1/2005 | Myers et al. .............. 715/513 |
| 6,938,204 | B1 | * | 8/2005 | Hind et al. ................ 715/515 |
| 2002/0004813 | A1 | * | 1/2002 | Agrawal et al. ........... 709/201 |
| 2002/0069222 | A1 | * | 6/2002 | McNeely ................... 707/513 |
| 2002/0133637 | A1 | * | 9/2002 | Popp et al. ................ 709/315 |

FOREIGN PATENT DOCUMENTS

JP              11-272666          10/1999

OTHER PUBLICATIONS

Homer et al., "Instant HTML", copyright 1997, pp. 76-107.*

* cited by examiner

*Primary Examiner*—Stephen Hong
*Assistant Examiner*—Thu Huynh
(74) *Attorney, Agent, or Firm*—Staas & Halsey LLP

(57) ABSTRACT

A recording medium readable by a computer, tangibly embodying a program of instructions executable by the computer to modify a document including a plurality of areas, a part or all of the plurality of areas including identification, is provided. The program includes the steps of inputting the document, inputting an instruction to the plurality of areas specified by the identification, modifying the document according to the instruction inputted to the plurality of areas specified by the identification, and outputting the document. According to the program, documents slightly different from each other can be created dynamically and easily, by use of a single original document and instructions, and thus productivity of the documents increases.

3 Claims, 4 Drawing Sheets

FIG.2A

<!--#struct AreaName { -->

Area

<!-- AreaName #variable WordLine_R1,

Word Line_R2,••{-->

Area

AreaName    {
    WordLine_R = "WordLine_S",•••

ChildAreaName {
            WordLine_R = "WordLine_S",•••

GrandChildAreaName {
                    WordLine_R = "WordLine_S",•••
                }
        }

ChildAreaName {
            WordLine_R = "WordLine_S",••
        }

RECORDING MEDIUM STORING DOCUMENT CONSTRUCTING PROGRAM

BACKGROUND OF THE INVENTION

1. Field of the Invention

The present invention relates to a program constructing technology, and more particularly relates to a technology to dynamically construct a plurality of programs similar to each other.

2. Description of the Related Art

A Web browser program including a Web server program and a Web client program is utilized in wide areas including application systems such as information searching and online shopping on the Internet. In such systems, data is transmitted or received between a Web server and a Web client by following an HTTP protocol. Data transmitted from a Web server to a Web client is called an HTML document following a fixed specification. There are two major methods of transmitting an HTML document. One of the methods is a static HTML document transmission, whereas the other method is called a dynamic HTML document transmission. In the static HTML document transmission method, the HTML document is created and stored in a file at the Web server, in advance. The Web server transmits the HTML document to the Web client if the Web client specifies the HTML document and requests the Web server to transmit the HTML document by using a URL.

On the other hand, in the dynamic HTML document transmission method, the Web server program, by following a CGI (Common Gateway Interface), calls one of other CGI programs. A CGI program called by the Web server program outputs data following a specification of the HTML document. Subsequently, the Web server program transmits the data to the Web client.

By use of a dynamic HTML document construction method, an HTML document can include personal information such as a user name and a user ID. As a result, such personal information can be displayed on a Web client's monitor. The personal information can be included in the HTML document by one of the dynamic HTML document construction methods inserting a programming language to a variable part of an original HTML document. An advantage of such method is that perception of contents of a modified HTML document is uncomplicated since a program is inserted to the original HTML document. According to the method of inserting the programming language to the original HTML document, an HTML document displaying information stored in a database as a table can be created, by taking the steps of preparing an original HTML document, and by replacing or inserting letters on the original HTML document.

The above-described dynamic HTML document construction method is effective in a case of performing simple operations including replacement of letters and addition of a row to a table. However, in a case in which the above-described dynamic HTML document construction method is applied to replacement of contents obtained by a complicated calculation, the original HTML document becomes more complicated and less understandable. The simple replacement of letter in an HTML document cannot support construction of the HTML document utilized in a complicated Web-base application. For instance, a plurality of HTML documents occasionally include an identical main part, but partially include input items different from each other. This difference is neither a simple word-line difference, nor simple addition of a row to a table. For example, an application system is considered, the application system checking a qualification of a user logging on to the application system, and displaying an input field and a button corresponding to a user rank in a company on a next screen. In the application system, there are variations of the next screen to be displayed according to the user rank such as a regular staff or an executive. The variations can be hardly covered by the above-described method.

SUMMARY OF THE INVENTION

Accordingly, it is a general object of the present invention to provide a recording medium storing a program constructing a document. More particular object of the present invention is to provide a recording medium storing a program constructing a dynamic document easily.

The above-described object of the present invention is achieved by a recording medium readable by a computer, tangibly embodying a program of instructions executable by the computer to modify a document including a plurality of areas, a part or all of the plurality of areas including identification, the program including the steps of inputting the document, inputting an instruction to the plurality of areas specified by the identification, modifying the document according to the instruction inputted to the plurality of areas specified by the identification, and outputting the document. According to the program, documents slightly different from each other can be created dynamically and easily, by use of a single original document and instructions, and thus productivity of the documents increases.

Other objects, features and advantages of the present invention will become more apparent from the following detailed description when read in conjunction with the accompanying drawings.

BRIEF DESCRIPTION OF THE DRAWINGS

FIGS. 2A and 2B are diagrams respectively showing a method of specifying an area in an original document, and a method of specifying a word line to be replaced in the original document;

FIG. 3 is a diagram showing a grammar of a parameter transferred from an application program to a document modification program;

DESCRIPTION OF THE PREFERRED EMBODIMENTS

A description will now be given of preferred embodiments of the present invention, with reference to the accompanying drawings.

Figure 1:
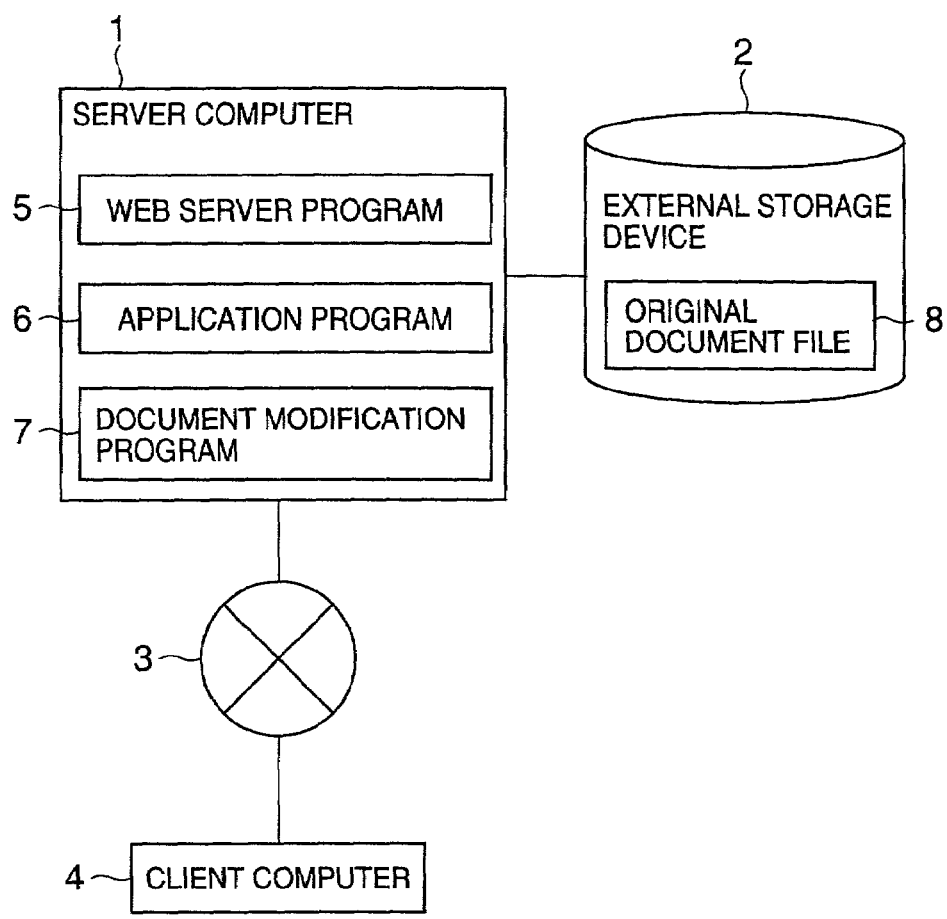
FIG. 1 is a diagram showing a structure of an application system to which the present invention is adopted.

FIG. 1 is a diagram showing a structure of an application system to which the present invention is adopted. The application system shown in FIG. 1 includes a server computer 1, an external storage device 2, a network 3 and a client computer 4. The server computer 1 includes a Web server program 5, an application program 6 and a document modification program 7. The external storage device 2 stores an original document file 8.

The server computer 1 is a computer including a CPU and a memory not shown in figures, for instance, and is connected to the external storage device 2 and the network 3. The server computer 1 executes the Web server program 5, the application program 6 and the document modification program 7. The client computer 4 is connected to the server computer 1 through the network 3, and executes a Web browser program.

The Web server program 5 calls the application program 6 via a CGI, in accordance with an operation of the client computer 4 by a user. Additionally, the Web server program 5 receives an HTML document supplied from the application program 6 via the CGI, and transmits the HTML document to the client computer 4. The application program 6 called by the Web server program 5 calls the document modification program 7, and transfers a parameter necessary for constructing the HTML document used for outputting a desired screen. Additionally, the application program 6 receives the HTML document supplied from the document modification program 7, and supplies the HTML document to the Web server program 5. Individual processes performed by the application program 6 depend on its functions, and thus a description will be omitted of the individual processes.

An original document stored in the original document file 8 is an HTML document including all information displayed on a monitor of the client computer 4. For instance, in a case in which the application system displays a part X on the monitor of the client computer 4 if a condition A is satisfied, or displays a part Y on the monitor if a condition B is satisfied, the parts X and Y are both included in the original document. A starting position, an ending position and a name of an area such as the part X or the part Y, and information about a word line to be replaced in the area are included as a comment of an HTML document in the original document for specifying the area. A comment in an HTML document starts with "<!--", and ends with "-->".

FIGS. 2A and 2B are diagrams showing a method of specifying an area in an original document, and a method of specifying a word line to be replaced in the original document, respectively. According to the method of specifying an area shown in FIG. 2A, a keyword "#struct" indicates a declaration of an area. Characters "{" and "}" respectively indicates a start and an end of the area. A name of the area is inserted to a position "AreaName". Additionally, an area can take a nesting structure. In other words, a plurality of child areas can be declared in the area. According to the method of specifying a word line to be replaced in an original document shown in FIG. 2B, a word line or word lines that are to be replaced in an area are declared by use of a keyword "#variable" following a declaration of the area. It should be noted that the word lines to be replaced are named in FIG. 2B as "WordLine_R1", "WordLine_R2", and so on.

FIG. 3 is a diagram showing a grammar of a parameter transferred from the application program 6 to the document modification program 7. Use of a parameter can specify to output or not to output each area corresponding to the original document by following a parent-child relation of the area. If an area is specified by the parameter, the area is outputted. On the other hand, if the area is not specified by the parameter, the area is not outputted even if the area is written in the original document. A plurality of parts such as records in a table can be outputted by specification of a single area for the plurality of times shown in FIG. 3. If a word line "WordLine_R" to be replaced is specified, and no word line to be substituted for the word line "WordLine_R" is specified, the word line "WordLine_R" is deleted from an output document. A word line to be substituted for the word line "WordLine_R" is called "WordLine_S" in FIG. 3.

Figure 4:
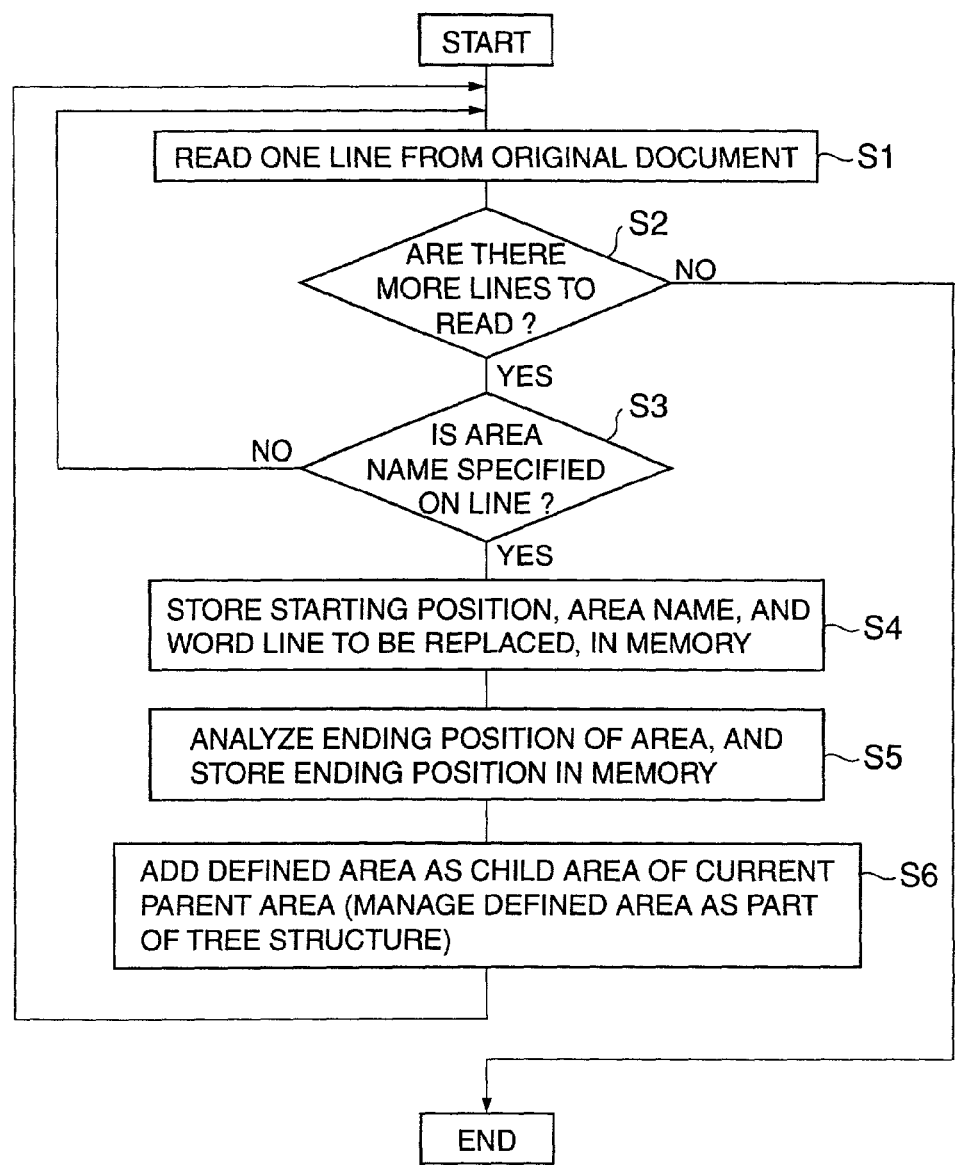
FIG. 4 is a flowchart showing processes performed by the document modification program to read the original document from an original document file and to store the original document structurally.

A description will now be given of processes performed by the document modification program 7 to read the original document from the original document file 8 and to store the original document structurally, with reference to FIG. 4. The document modification program 7 initially reads one line from the original document, at a step S1. If the document modification program 7 determines at a step S2 that there is no more line in the original document, the document modification program 7 ends the processes. If the document modification program 7 determines at the step S2 that there are more than a single line, the document modification program 7 proceeds to a step S3, locates a line, and checks whether the line indicates a beginning (a starting position) of an area. To be concrete, in a case of detecting a format "<!-- AreaName . . . -->" on the line, the document modification program 7 determines that the line is the beginning of an area. If having determined at the step S3 that the line is not the beginning of an area, the document modification program 7 proceeds to the step S1. On the other hand, if having determined at the step S3 that the line is the beginning of an area, the document modification program 7 proceeds to a step S4, and stores a starting position (a line number), an area name and a word line to be replaced in the area, in a memory not shown in the figures. Subsequently, at a step S5, the document modification program 7 analyzes an ending position of the area, and stores the ending position (a line number) obtained by the analysis in the memory. At a step S6, the document modification program 7 adds the area whose starting and ending positions have been determined as a child area of a current parent area to a tree structure, and manages the area in the tree structure. If there is no parent area for the area whose starting and ending positions have been determined, the area becomes a parent area. Subsequently, the document modification program 7 proceeds to the step S1, and executes the above-described processes.

Figure 5:
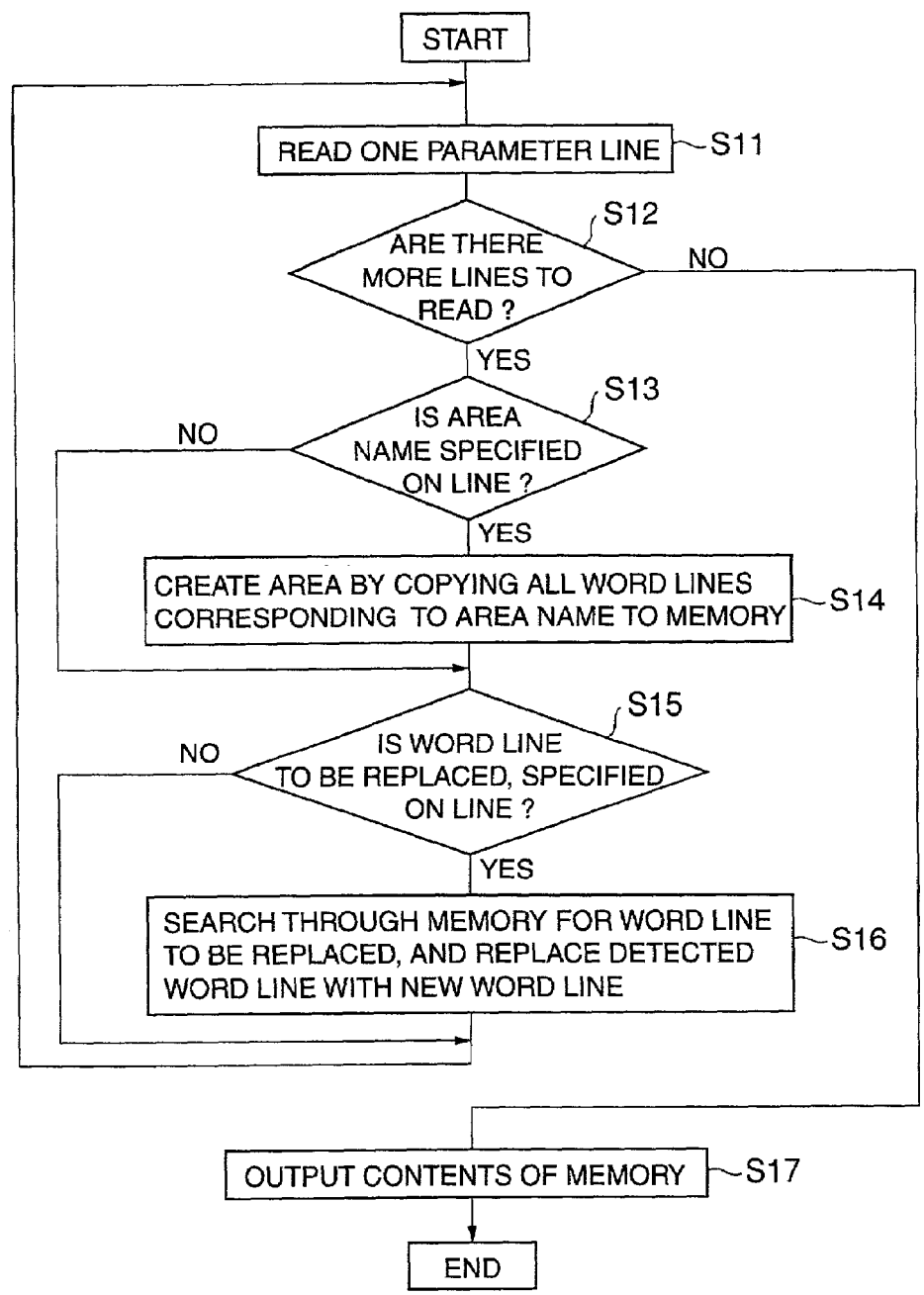
FIG. 5 is a flowchart showing process performed by the document modification program in a case of receiving a parameter from the application program.

A description will now be given of a process performed by the document modification program 7 in a case of receiving a parameter from the application program 6, with reference to FIG. 5. The document modification program 7 initially reads a line of a parameter, at a step S11 shown in FIG. 5. If the document modification program 7 determines at a step S12 that there is no more parameter line, the document modification program 7 proceeds to a step S17. If the document modification program 7 determines at the step S12 that the there is more than a single parameter line, the document modification program 7 proceeds to a step S13, and checks whether an area name is specified on the line read at the step S1. To be concrete, if a pattern "AreaName { }" appears on the line, the document modification program 7 can determine that the area name is specified on the line. If having determined at the step S13 that an area name is specified on the line, the document modification program 7 proceeds to the step S14, and creates an area corresponding to the area name. To be concrete, the document modification program 7 creates the area by copying all the word lines included in the area corresponding to the area name in the original document, to the memory. Subsequently, the document modification program 7 proceeds to a step S15. If having determined at the step S13 that an area name is not specified on the line, the document modification program 7 skips the step S14, and proceeds to the step S15. At the step S15, the document modification program 7 checks whether a word line "WordLine_R" to be replaced is specified on the line. If having determined at the step S15 that the word line "WordLine_R" is specified on the line, the document modification program 7 searches through the memory storing all the word lines in the area for the word line "WordLine R", and replaces the word line "WordLine_R" with a word line "WordLine_S" to be substituted for the word line "WordLine_R", at a step S16. If a character "=" located between the word lines "WordLine_R" and "WordLine_S" or the word line "WordLine_S" are omitted from the line, the word line "WordLine_R" is eliminated from an output document. Subsequently, the document modification program proceeds to the step S11. On the other hand, if having determined at the step S15 that the word line "WordLine_R" is not specified on the line, the document modification program 7 skips the step S16, and proceeds to the step S11. The document modification program 7 repeats the above-described steps, and proceeds to the step S17 if having determined at the step S12 that there is no more line to read in the original document. At the step S17, the document modification program 7 outputs contents of the memory to the application program 6, and ends the process.

In the above description, definition of an area is inserted to the original document as a comment. However, the definition of the area may be stored in a file different from the original document file 8. In such a case, an area name, a line number of a starting position of the area and the number of lines included in the area should be specified in the file different from the original document file 8.

According to the present invention, documents slightly different from each other can be outputted on a monitor dynamically and easily, by use of a single original document and a parameter, and thus productivity of a Web screen increases. In a case in which a new variation of the Web screen is necessary, only a parameter corresponding to the new variation should be added to the original document. Additionally, in a case of changing a fixed part of the Web screen, only the original document should be modified. Thus, an application program using the Web screen is not necessarily modified. Additionally, only the single original document is necessary for creating variations of the Web screen, security of the Web screen increase.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-333616, filed on Oct. 31, 2000, the entire contents of which are hereby incorporated by reference.

What is claimed is:

1. A recording medium readable by a computer, tangibly embodying a program executable by the computer to make a modified document based on an original document file, by:

reading an original document from the original document file;

referring to a parameter which specifies an area to be processed, a word line to be replaced in the area, and a word line to be substituted for the replaced word line, to determine the area to be processed in the read original document;

determining whether the word line specified by the parameter to be replaced is in the area, in response to determining the area to be processed;

substituting the word line specified by the parameter for the word line to be replaced in the area in response to determining that the word line to be replaced is in the area to be processed; and inputting a name of the area, a start line of the area, and the number of lines included in the area as identification;

wherein said original document is in a fixed format including at least one comment, and the identification is included in the area to be processed as the comment.

2. A document modifying apparatus, including a memory, for making a modified document based on an original document file, comprising:

means for reading an original document from the original document file:

means for referring to a parameter which specifies an area to be processed, a word line to be replaced in the area, and a word line to be substituted for the replaced word line, to determine the area to be processed in the read original document;

means for determining whether the word line specified by the parameter to be replaced is in the area, in response to determining the area to be processed;

means for substituting the word line specified by the parameter for the word line to be replaced in the area in response to determining that the word line to be replaced is in the area to be processed; and means for inputting a name of the area, a start line of the area, and the number of lines included in the area as identification;

wherein said original document is in a fixed format including at least one comment, and the identification is included in the area to be processed as the comment.

3. A document constructing system, comprising:

a storage unit;

a document storing unit to store a document to be modified to said storage unit;

a document reading unit to read the document from the storage unit;

a parameter referring unit to refer to a parameter which specifies an area to be processed, a word line to be replaced in the area, and a word line to be substituted for the replaced word line, to determine the area to be processed in the read document;

a document modifying unit to determine whether the word line specified by the parameter to be replaced is in the area, in response to determining the area to be processed, and to substitute the word line specified by the parameter for the word line to be replaced in the area in response to determining that the word line to be replaced is in the area to be processed;

a document transmitting unit to transmit the modified document to a network; and an identification inputting unit inputting a name of the area, a start line of the area, and the number of lines included in the area as identification.

* * * * *

UNITED STATES PATENT AND TRADEMARK OFFICE
CERTIFICATE OF CORRECTION

PATENT NO. : 7,269,791 B2 Page 1 of 1
APPLICATION NO. : 09/818556
DATED : September 11, 2007
INVENTOR(S) : Yasuyuki Fujikawa It is certified that error appears in the above-identified patent and that said Letters Patent is hereby corrected as shown below:

Column 6, Line 18, change "file:" to --file;--.

Signed and Sealed this

Twenty Second Day of April, 2008

JON W. DUDAS
*Director of the United States Patent and Trademark Office*